US008306790B2

(12) United States Patent
Ide et al.

(10) Patent No.: US 8,306,790 B2
(45) Date of Patent: Nov. 6, 2012

(54) APPARATUS, METHOD, AND PROGRAM FOR ACOUSTIC CHARACTERISTICS OPTIMIZATION MODEL ANALYSIS

(75) Inventors: Takanori Ide, Kariya (JP); Masaki Otomori, Nukata-gun (JP); Yohei Kitamura, Anjo (JP); Iku Kosaka, Novi, MI (US)

(73) Assignees: Aisin AW Co., Ltd., Anjo (JP); Vanderplaats R & D Inc., Novi, MI (US)

( * ) Notice: Subject to any disclaimer, the term of this patent is extended or adjusted under 35 U.S.C. 154(b) by 292 days.

(21) Appl. No.: 12/656,272

(22) Filed: Jan. 22, 2010

(65) Prior Publication Data

US 2010/0204965 A1 Aug. 12, 2010

(30) Foreign Application Priority Data

Jan. 30, 2009 (JP) ................. 2009-020193

(51) Int. Cl.
*G06F 17/50* (2006.01)
*G06F 7/48* (2006.01)
(52) U.S. Cl. .............. 703/1; 703/2; 703/6; 703/7; 703/8
(58) Field of Classification Search .................. 703/1, 2, 703/6, 7, 8
See application file for complete search history.

(56) References Cited

U.S. PATENT DOCUMENTS

| 5,963,459 | A  | * | 10/1999 | Burnett et al. | 703/5 |
| 6,985,836 | B2 | * | 1/2006  | Cremers et al. | 703/2 |
| 7,438,263 | B2 | * | 10/2008 | Rassaian et al. | 244/129.3 |
| 7,925,475 | B2 | * | 4/2011  | Rassaian et al. | 703/1 |
| 2007/0069079 | A1 | * | 3/2007 | Rassaian et al. | 244/129.3 |
| 2007/0208443 | A1 | * | 9/2007 | Caprioli | 700/97 |
| 2007/0220454 | A1 | * | 9/2007 | Rassaian et al. | 716/4 |
| 2010/0153077 | A1 | * | 6/2010 | Suresh et al. | 703/2 |
| 2010/0305746 | A1 | * | 12/2010 | Shiraishi | 700/199 |

FOREIGN PATENT DOCUMENTS

JP A 2007-188164 7/2007

OTHER PUBLICATIONS

Citaralla et al. "Modal Acoustic Transfer Vector Approach in a FEM-BEM Vibro-Acoustic Analysis", Engineering Analysis with Boundary Elements 31 (2007) 248-258.*
Kim et al. "Design sensitivity analysis for sequential structural-acoustic problems", Journal of Sound and Vibration 263 (2003) 569-591.*
Marburg et al. "A general concept for design modification of shell meshes in structural-acoustic optimization—Part II: Application to a floor panel in sedan interior noise problems", Finite Elements in Analysis and Design 38 (2002) 737-754.*

(Continued)

*Primary Examiner* — Shambhavi Patel
(74) *Attorney, Agent, or Firm* — Oliff & Berridge, PLC

(57) ABSTRACT

An acoustic characteristics optimization model analysis apparatus includes a finite element model generation unit; a boundary element model generation unit; an acoustic transfer function calculation unit; a nodal point association unit; and a sound pressure calculation unit that incorporates the plurality of nodal points of the finite element model correlated with the plurality of nodal points of the boundary element model by the nodal point association unit into the acoustic transfer function calculated by the acoustic transfer function calculation unit to calculate a sound pressure transmitted from the finite element model to the predetermined position.

4 Claims, 6 Drawing Sheets

OTHER PUBLICATIONS

Marburg et al. "A general concept for design modi cation of shell meshes in structural-acoustic optimization—Part I: formulation of the concept", Finite Elements in Analysis and Design 38 (2002) 725-735.*

Marburg et al. "Shape Optimization of a Vehicle Hat Shelf: Improving Acoustic Properties for Different Load Cases by Maximizing First Eigenfrequency", Computers and Structures 79 (2001) 1943-1957.*

Marburg et al. "Efficient optimization of a noise transfer function by modification of a shell structure geometry—Part II: Application to a vehicle dashboard", Struct Multidisc Optim 24, 60-71 Springer-Verlag 2002.*

Dong et al. "Design Optimization for Structural-Acoustic Problems Using FEA-BEA With Adjoint Variable Method", Journal of Mechanical Design, May 2004, vol. 126.*

Tinnsten et al. "Optimization of acoustic response—a numerical and experimental comparison", Struct Multidisc Optim 19, 122-129 Springer-Verlag 2000.*

James et al. "Precomputed Acoustic Transfer: Output-sensitive, accurate sound generation for geometrically complex vibration sources", 2006.*

Jarng et al. "Comparison of Barrel-Stave Sonar Transducer Simulations Between a Coupled FE-BEM and ATILA", IEEE Sensors Journal, vol. 3, No. 4, Aug. 2003.*

Marburg et al. "Efficient optimization of a noise transfer function by modification of a shell structure geometry—Part I: Theory", Struct Multidisc Optim 24, 51-59 Springer-Verlag 2002.*

Fiala et al. "Numerical modelling of ground-borne noise and vibration in buildings due to surface rail traffic", Journal of Sound and Vibration 301 (2007) 718-738.*

* cited by examiner

APPARATUS, METHOD, AND PROGRAM FOR ACOUSTIC CHARACTERISTICS OPTIMIZATION MODEL ANALYSIS

INCORPORATION BY REFERENCE

The disclosure of Japanese Patent Application No. 2009-020193 filed on Jan. 30, 2009 including the specification, drawings and abstract is incorporated herein by reference in its entirety.

BACKGROUND

The present invention relates to an apparatus, a method, and a program for acoustic characteristics optimization model analysis that are used to analyze the structural configuration of a design model with optimized acoustic characteristics.

In the related art, when optimizing the acoustic characteristics of a design model, the structural characteristics and the acoustic characteristics of the design model are first individually analyzed on a computer through numerical simulation that uses a numerical analysis program, and then a designer takes the entire analysis results into consideration to specify a structural portion that is effective for improving the acoustic characteristics. Subsequently, the designer prepares a modified model by modifying, for example reinforcing, the specified structural portion, and then analyzes the structural characteristics and the acoustic characteristics of the prepared modified model on the computer to specify a structural portion of the modified model to be reinforced again. Thereafter, the designer iteratively performs this cycle of processes to derive an optimum structural configuration of the design model.

In the case where a complicated design model is to be analyzed using the above method, however, the analysis results of the structural characteristics and the acoustic characteristics of the design model output from the computer may be so intricate as to impose excessive intellectual work on the designer. Accordingly, in an acoustic structure optimum design analysis system disclosed in Japanese Patent Application Publication No. 2007-188164 (JP-A-2007-188164), the structural behavior and the acoustic characteristics of a design model are individually analyzed, and then the analysis results are used to automatically derive on a computer an optimum structural configuration of the design model with an indication of a structural portion of the design model to be modified in order to optimize the acoustic characteristics of the design model.

SUMMARY

In the acoustic structure optimum design analysis system disclosed in JPA-2007-188164, however, it is necessary to reanalyze the structural behavior and the acoustic characteristics of the design model on the computer each time the structural configuration of the design model is changed in the course of obtaining an optimum structural configuration of the design model. Therefore, with the acoustic structure optimum design analysis system, an excessive processing load may be imposed on the computer when optimizing the acoustic characteristics of the design model, and thus it may be difficult to derive an optimum structural configuration of the design model reliably in a short time.

The present invention has been made in view of the foregoing circumstances, and it is therefore an object of the present invention to provide an apparatus, a method, and a program for acoustic characteristics optimization model analysis that are capable of analyzing the structural configuration of a design model with optimized acoustic characteristics quickly and easily.

In order to achieve the foregoing object, an acoustic characteristics optimization model analysis apparatus according to a first aspect of the present invention includes: a finite element model generation unit that generates on the basis of a structural configuration of a design model having a three-dimensional shape a finite element model for analyzing acoustic characteristics of the design model by a finite element method; a boundary element model generation unit that generates a boundary element model for analyzing the acoustic characteristics of the design model by a boundary element method on the basis of the finite element model; an acoustic transfer function calculation unit that calculates an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points; a nodal point association unit that correlates the plurality of nodal points set for the boundary element model with a plurality of nodal points set between a plurality of element regions forming the finite element model; and a sound pressure calculation unit that incorporates the plurality of nodal points of the finite element model correlated with the plurality of nodal points of the boundary element model by the nodal point association unit into the acoustic transfer function calculated by the acoustic transfer function calculation unit to calculate a sound pressure transmitted from the finite element model to the predetermined position.

According to the above configuration, the sound pressure transmitted from the finite element model to a predetermined position can be calculated by incorporating a plurality of nodal points set on the finite element model correlated with a plurality of nodal points set on the boundary element model into an acoustic transfer function that indicates the correspondence between displacement of the plurality of nodal points set on the boundary element model and the sound pressure transmitted from the boundary element model to the predetermined position in accordance with the displacement of the plurality of nodal points. Therefore, the structural configuration of a design model with optimized acoustic characteristics can be analyzed by modifying the structural design of the finite element model so as to minimize the sound pressure transmitted from the finite element model to the predetermined position.

The acoustic characteristics optimization model analysis apparatus according to the first aspect of the present invention may further include: a shell model generation unit that generates a shell model by dividing a surface of the finite element model into a plurality of plate elements; an acoustic characteristics optimization model generation unit that superimposes the shell model on the surface of the finite element model to generate an acoustic characteristics optimization model; and an acoustic characteristics optimization model change unit that virtually changes a thickness of each of the plate elements of the shell model through calculation for optimizing acoustic characteristics of the acoustic characteristics optimization model on the basis of a result of calculation performed by the sound pressure calculation unit without changing relative positional relationship between the plurality of plate elements of the shell model positioned on a surface of the acoustic characteristics optimization model and the predetermined position.

According to the above configuration, even when the thickness of each plate element of the shell model is virtually changed in the course of optimizing the acoustic characteristics of the acoustic characteristics optimization model, the plurality of nodal points on the finite element model are still disposed to be positioned on the plate elements of the shell model on the surface of the acoustic characteristics optimization model. Therefore, even when the thickness of each plate element of the shell model is changed in the course of optimizing the acoustic characteristics of the acoustic characteristics optimization model, the sound pressure transmitted from the acoustic characteristics optimization model to the predetermined position can be calculated by introducing the plurality of nodal points set on the finite element model, which are correlated with the plurality of nodal points set on the boundary element model, into an acoustic transfer function that indicates the correspondence between displacement of the plurality of nodal points set on the boundary element model and the sound pressure transmitted from the boundary element model to the predetermined position in accordance with the displacement of the plurality of nodal points. In addition, the acoustic transfer function is determined in accordance with the relative positional relationship between the plurality of nodal points set on the boundary element model and the predetermined position, and therefore can be used recursively when calculating the sound pressure transmitted from the acoustic characteristics optimization model to the predetermined position in the course of optimizing the acoustic characteristics of the acoustic characteristics optimization model. Thus, the structural configuration of a design model with optimized acoustic characteristics can be analyzed reliably in a short time without imposing an excessive processing load on a computer when optimizing the acoustic characteristics of the acoustic characteristics optimization model.

The acoustic characteristics optimization model analysis apparatus according to the first aspect of the present invention may further include a determination unit that determines whether or not the acoustic characteristics of the acoustic characteristics optimization model in which the thickness of each of the plate elements of the shell model has been changed by the acoustic characteristics optimization model change unit have been optimized, and the acoustic characteristics optimization model change unit may further change the thickness of each of the plate elements of the shell model to optimize the acoustic characteristics of the acoustic characteristics optimization model in the case where a result of determination performed by the determination unit is negative.

According to the above configuration, the acoustic characteristics optimization model change unit can recursively execute optimization of the acoustic characteristics of the acoustic characteristics optimization model until a structural configuration of a design model with optimized acoustic characteristics is obtained.

In the acoustic characteristics optimization model analysis apparatus according to the first aspect of the present invention, the determination unit may determine that the acoustic characteristics of the acoustic characteristics optimization model have been optimized when a difference between a sound pressure transmitted from the acoustic characteristics optimization model before the model change unit changes the thickness of each of the plate elements of the shell model to the predetermined position and a sound pressure transmitted from the acoustic characteristics optimization model after the model change unit changes the thickness of each of the plate elements of the shell model to the predetermined position falls below a preset threshold.

According to the above configuration, the determination unit can determine that the sound pressure transmitted from the acoustic characteristics optimization model to the predetermined position has been sufficiently reduced as a result of optimization of the acoustic characteristics of the acoustic characteristics optimization model, and can determine that optimization of the acoustic characteristics of the acoustic characteristics optimization model has been completed, when the amount of change in sound pressure transmitted from the acoustic characteristics optimization model to the predetermined position during a change in thickness of each plate element of the shell model falls below a preset threshold.

An acoustic characteristics optimization model analysis method according to a second aspect of the present invention includes: generating on the basis of a structural configuration of a design model having a three-dimensional shape a finite element model for analyzing acoustic characteristics of the design model by a finite element method; generating a boundary element model for analyzing the acoustic characteristics of the design model by a boundary element method on the basis of the finite element model; calculating an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points; correlating the plurality of nodal points set for the boundary element model with a plurality of nodal points set between a plurality of element regions forming the finite element model; and incorporating the plurality of nodal points of the finite element model correlated with the plurality of nodal points of the boundary element model in the correlating of the plurality of nodal points into the acoustic transfer function calculated in the calculating of the acoustic transfer function to calculate a sound pressure transmitted from the finite element model to the predetermined position. According to the above configuration, the same effect as that of the above acoustic characteristics optimization model analysis apparatus can be obtained.

An acoustic characteristics optimization model analysis program according to a third aspect of the present invention that causes an acoustic characteristics optimization model analysis apparatus to operate, the apparatus including a control unit that controls procedures of a process for optimizing acoustic characteristics of a design model having a three-dimensional shape, causes the control unit to function as: a finite element model generation unit that generates a finite element model for analyzing acoustic characteristics of the design model by a finite element method on the basis of a structural configuration of the design model; a boundary element model generation unit that generates a boundary element model for analyzing the acoustic characteristics of the design model by a boundary element method on the basis of the finite element model; an acoustic transfer function calculation unit that calculates an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points; a nodal point association unit that correlates the plurality of nodal points set for the boundary element model with a plurality of nodal points set between a plurality of element regions forming the finite element model; and a sound pressure calculation unit that incorporates the plurality of nodal points of the finite element model correlated with the plurality of nodal points of the boundary element model by the nodal point association unit into the acoustic transfer function set by the acoustic transfer function calculation unit to calculate a sound pressure transmitted from the finite element model to the predetermined position. According to the above configuration, the same effect as those of the above acoustic characteristics optimization model analysis apparatus and the above acoustic characteristics optimization model analysis method can be obtained.

DETAILED DESCRIPTION OF EMBODIMENTS

An embodiment of the present invention will be described below with reference to FIGS. 1 to 8.

Figure 1:
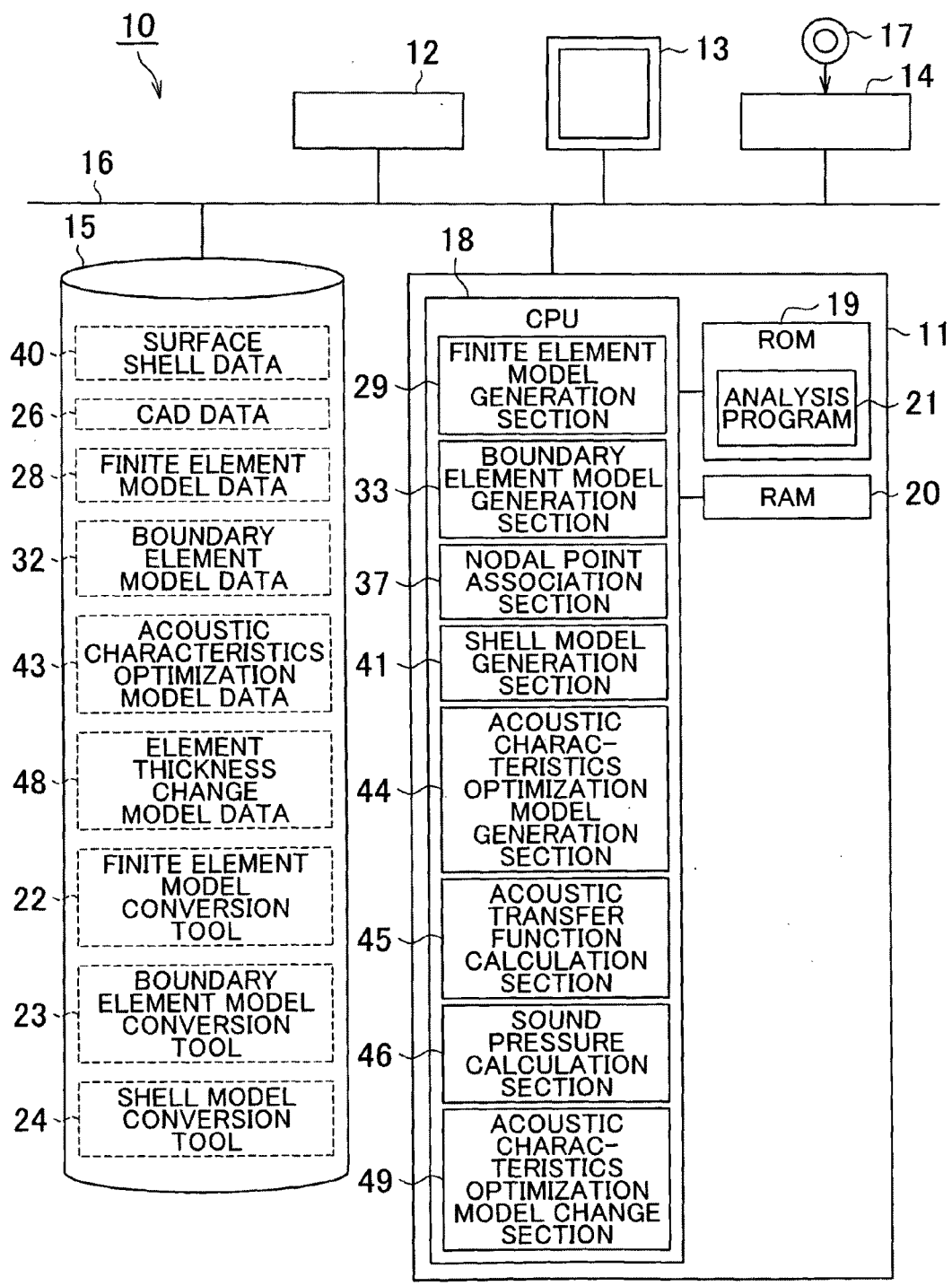
FIG. 1 is a block diagram showing a computer system according to an embodiment of the present invention.

As shown in FIG. 1, a computer system 10 according to the embodiment includes a control device 11, an input device 12, an output device 13, a reader device 14, and a disk device 15. In the computer system 10, the respective devices 11 to 15 are connected via a bus 16 to enable transfer of information between each other. The devices 11 to 15 are thus configured to serve as an acoustic characteristics optimization model analysis apparatus capable of performing various information processing.

A storage medium 17 such as a CD (Compact Disc) is insertable into and removable from the reader device 14. In the embodiment, a storage medium 17 storing CAD data on the structural configuration of a design model to be analyzed, a storage medium 17 storing finite element model conversion software for use to convert the CAD data into a finite element model, a storage medium 17 storing boundary element model conversion software for use to convert the finite element model into a boundary element model, and a storage medium 17 storing shell model conversion software for use to convert a surface of the finite element model into a large number of plate elements to obtain a shell model are selectively inserted into and removed from the reader device 14.

The control device 11 functions as a control unit that controls the operating state of the computer system 10. The specific configuration of the control device 11 will be discussed later. The input device 12 includes a keyboard, a mouse, etc., and is used to manually input various information. The output device 13 includes a CRT display or the like that can output the content of various information input via the input device 12 on the display. The reader device 14 reads various data such as program data stored in the storage medium 17 when the storage medium 17 such as a CD is inserted into the reader device 14. The disk device 15 stores the various data read through the reader device 14.

As shown in FIG. 1, the control device 11 is configured as a digital computer including an interface (not shown) that mediates exchange of information with an external device, a CPU 18 that serves as a central processing unit, a ROM 19 that stores predetermined information in a readable form, and a RAM 20 that stores various information in a rewritable/readable form. In order for the thus configured control device 11 to function as a digital computer, the CPU 18 performs various logical operations necessary to analyze the structural configuration of a design model with optimized acoustic characteristics when various information is input via the interface. The CPU 18 also reads and writes various information used in the logical operations. The ROM 19 stores an analysis program 21 to be used by the CPU 18 to control the operating state of the entire computer system 10 in analyzing the structural configuration of a design model with optimized acoustic characteristics. The RAM 20 appropriately stores the content of various information used and rewritten in the logical operations performed by the CPU 18 during operation of the computer system 10.

When a storage medium 17 storing any of the various model conversion software described above is inserted into the reader device 14, the CPU 18 causes the reader device 14 to read the data content of the model conversion software stored in the storage medium 17, and causes the disk device 15 to store the read data content as a corresponding one of a finite element model conversion tool 22, a boundary element model conversion tool 23, and a shell model conversion tool 24.

Figure 2:
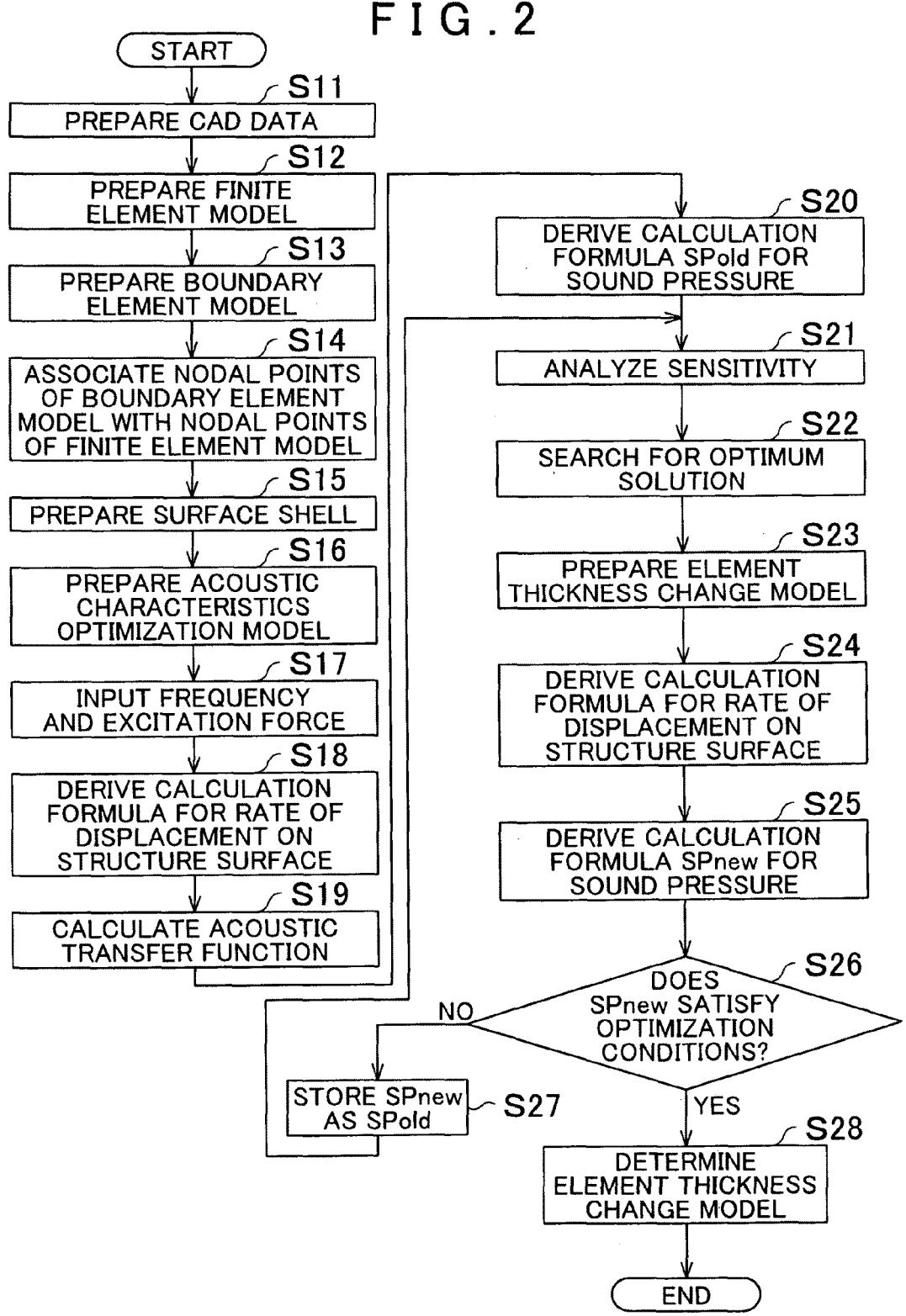
FIG. 2 is a flowchart showing an acoustic characteristics optimization process routine of an analysis program.

Now, an acoustic characteristics optimization process routine executed by the control device 11 according to the embodiment when the analysis program 21 is started will be described with reference to FIG. 2, using a transfer case 25 for an automatic transmission to be mounted on a vehicle as a subject to be analyzed (that is, a design model).

First, when a storage medium 17 storing CAD data 26 representing the three-dimensional shape of the transfer case 25 is inserted into the reader device 14, the control device 11 causes the disk device 15 to store the CAD data 26 stored in the storage medium 17 (step S11).

Figure 3:
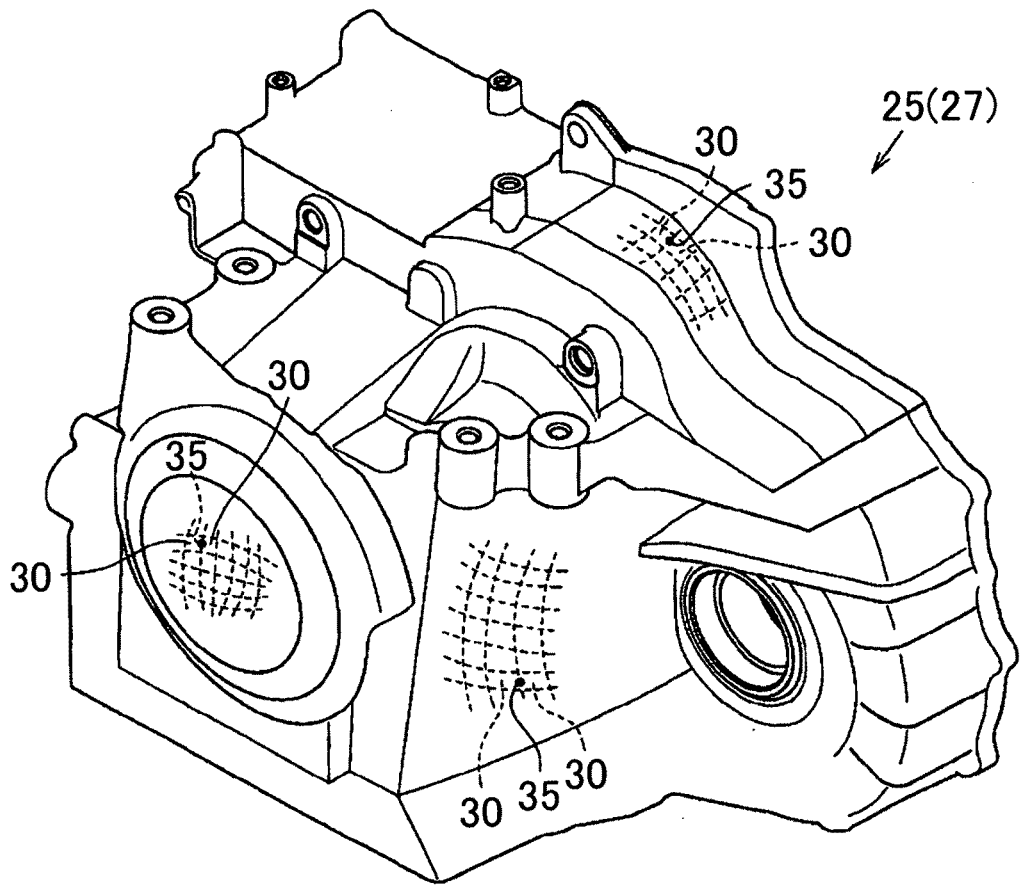
FIG. 3 is a perspective view showing a finite element model according to the embodiment of the present invention.

Then, as a finite element model generation step, the control device 11 starts the finite element model conversion tool 22 stored in the disk device 15 to convert the CAD data 26 stored in the disk device 15 into specifications data 28 on a finite element model 27 (see FIG. 3), and causes the disk device 15 to store the specifications data 28 on the finite element model 27 obtained as a result of the conversion (step S12). In this respect, the control device 11 may be considered to include a finite element model generation section 29 which serves as a finite element model generation unit that generates a finite element model 27, which is used to analyze the acoustic characteristics of the transfer case 25 by a finite element method, on the basis of the CAD data 26 on the transfer case 25 to be analyzed. In FIG. 3, for convenience of understanding the description herein, only a part of a large number of element regions 30 forming the finite element model 27 are shown as enlarged for exaggeration.

Figure 4:
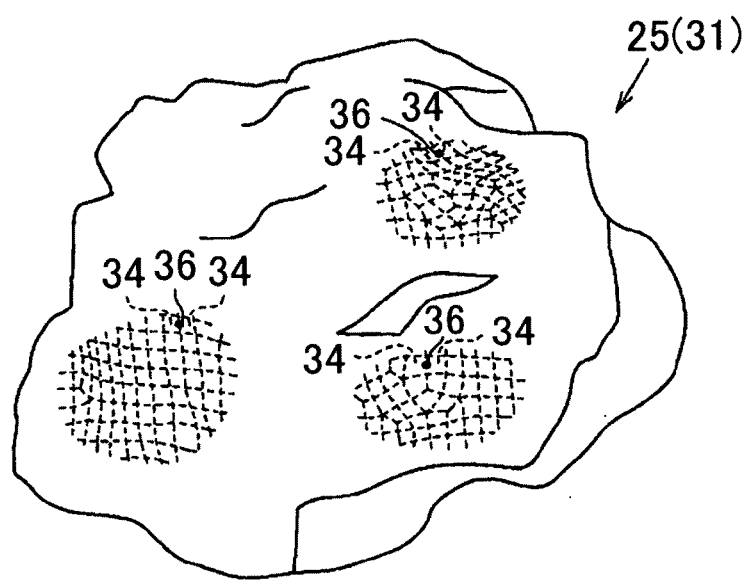
FIG. 4 is a perspective view showing a boundary element model according to the embodiment of the present invention.

Subsequently, as a boundary element model generation step, the control device 11 starts the boundary element model conversion tool 23 stored in the disk device 15 to convert the specifications data 28 on the finite element model 27 stored in the disk device 15 into specifications data 32 on a boundary element model 31 (see FIG. 4), and causes the disk device 15 to store the specifications data 32 on the boundary element model 31 obtained as a result of the conversion (step S13). In this respect, the control device 11 may be considered to include a boundary element model generation section 33 which serves as a boundary element model generation unit that generates a boundary element model 31, which is used to analyze the acoustic characteristics of the transfer case 25 by a boundary element method, on the basis of the specifications data 28 on the finite element model 27 of the transfer case 25. In FIG. 4, for convenience of understanding the description herein, only a part of a large number of element regions 34 forming the boundary element model 31 are shown as enlarged for exaggeration.

Then, as a nodal point association step, the control device 11 correlates nodal points 35 (see FIG. 3) set between the element regions 30 on the surface of the finite element model 27 generated in step S12 with nodal points 36 (see FIG. 4) set between the element regions 34 on the surface of the boundary element model 31 generated in step S13 (step S14). Specifically, the control device 11 reads out from the disk device 15 each of the specifications data 28 on the finite element model 27 generated in step S12 and the specifications data 32 on the boundary element model 31 generated in step S13, and outputs the models 27 and 31 to the output device 13 for display. The control device 11 then superimposes the models 27 and 31 on each other on the screen of the output device 13, and extracts a plurality of (in the embodiment, three) nodal points 35 on the finite element model 27 that are the most proximate to the corresponding nodal points 36 set on the boundary element model 31. Then, a weighted average of the rate at each nodal point 35 on the finite element model 27 is calculated in accordance with the distances between the nodal points 36 on the boundary element model 31 and the corresponding nodal points 35 on the finite element model 27 that are proximate to the above nodal points 36 as indicated by [Formula 1] below. The rate at each nodal point 36 on the boundary element model 31 is thus represented. In this respect, the control device 11 may be considered to include a nodal point association section 37 which serves as a nodal point association unit that correlates a plurality of nodal points 36 set between the plurality of element regions 34 forming the boundary element model 31 with a plurality of nodal points 35 set between the plurality of element regions 30 forming the finite element model 27.

$$v_{BG_i} = \alpha_{i1} v_{FG_{i1}} + \alpha_{i2} v_{FG_{i2}} + \alpha_{i3} v_{FG_{i3}}$$ [Formula 1]

$v_{BG_i}$ (i=1, ..., N): Rate at each nodal point of the boundary element model (N is the number of nodal points of the boundary element model)

$v_{FG_{ij}}$ (j=1,2,3): Rate at each nodal point of the finite element model $\alpha_{ij}$ (j=1,2,3): Weighting coefficient which satisfies $$\sum_{i=1}^{3} \alpha_i = 1$$

Figure 5:
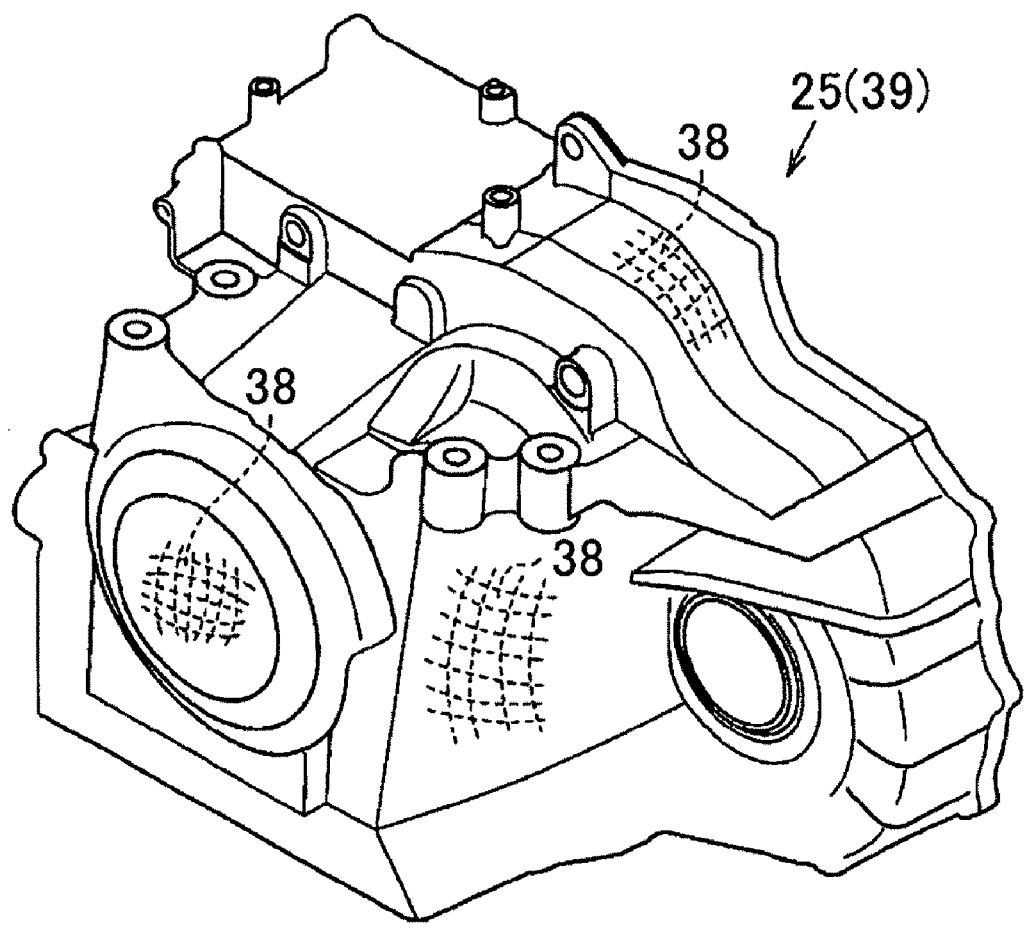
FIG. 5 is a perspective view showing a shell model according to the embodiment of the present invention.
Figure 6:
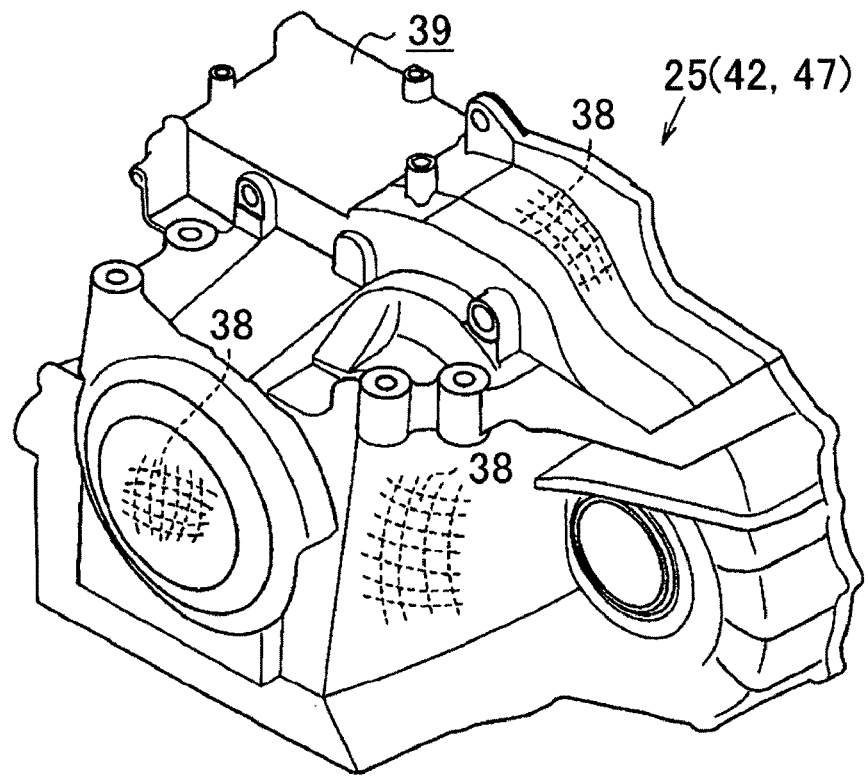
FIG. 6 is a perspective view showing an acoustic characteristics optimization model and an element thickness change model according to the embodiment of the present invention.
Figure 7:
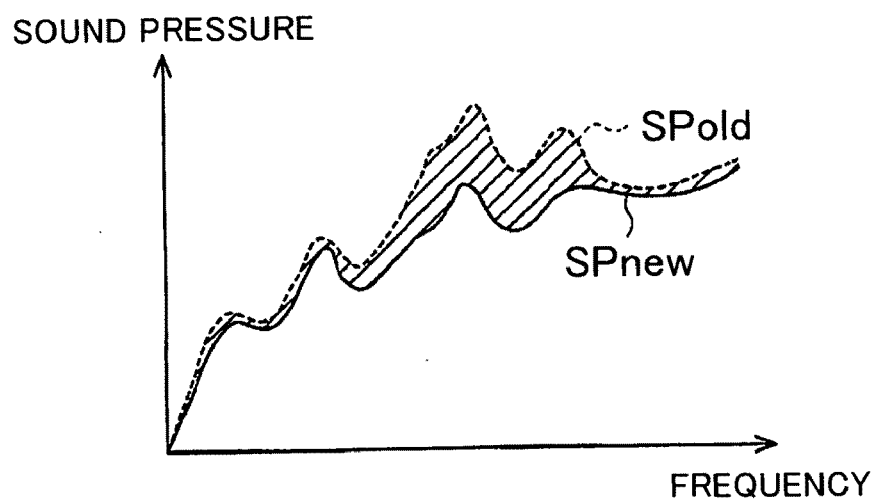
FIG. 7 shows the correlation between the sound pressure transmitted from a model to an observation point and the frequency.
Figure 8:
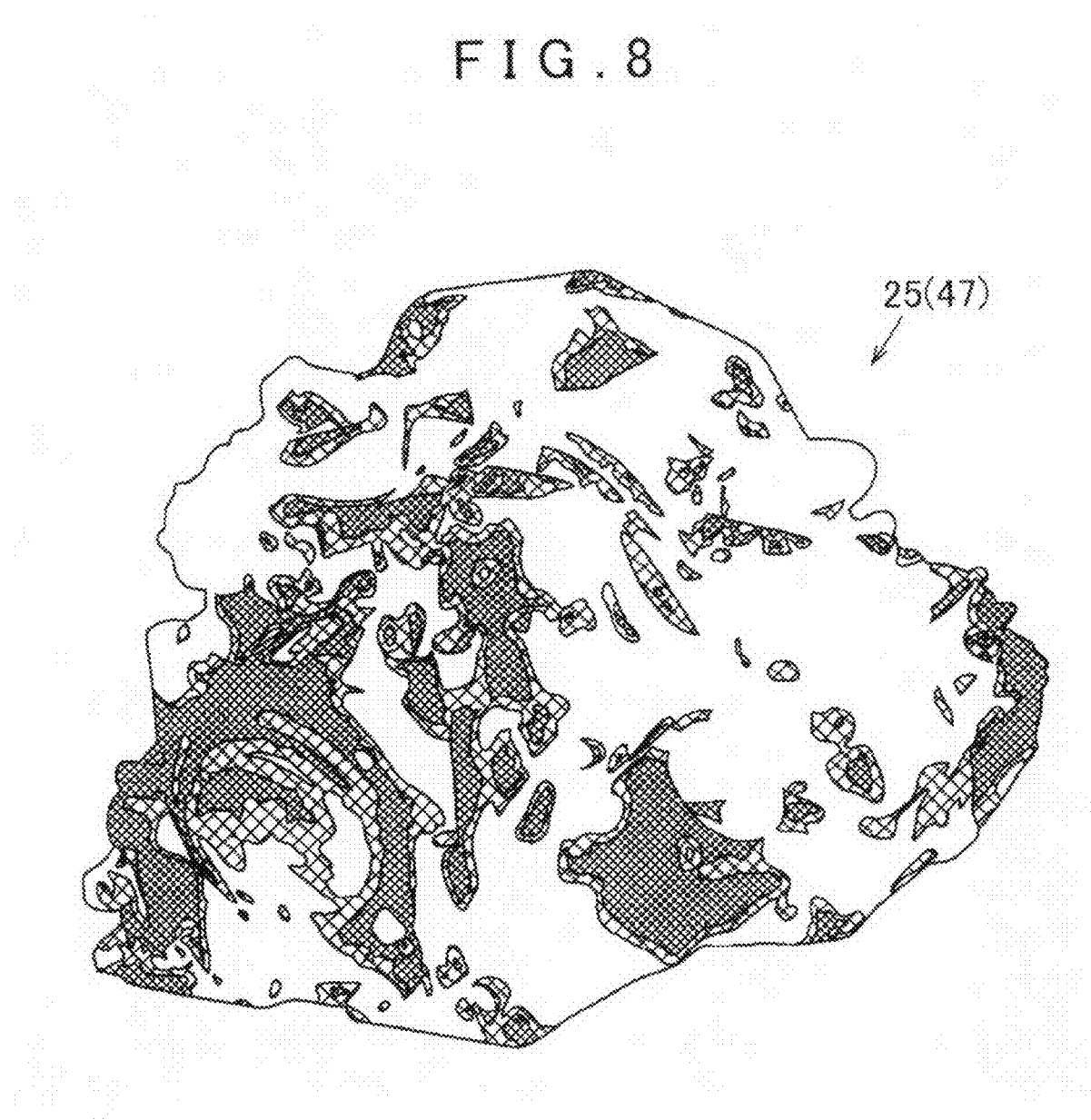
FIG. 8 is a schematic view showing the distribution of the thickness of each region of the element thickness change model with optimized acoustic characteristics.

Subsequently, as a shell model generation step, the control device 11 starts the shell model conversion tool 24 stored in the disk device 15 to generate a shell model 39 (see FIG. 5) by dividing the surface of the finite element model 27 stored in the disk device 15 into a large number of plate elements 38, and causes the disk device 15 to store specifications data 40 on the generated shell model 39 (step S15). In this respect, the control device 11 may be considered to include a shell model generation section 41 which serves as a shell model generation unit that generates a shell model 39 of the transfer case 25 on the basis of the specifications data 28 on the finite element model 27 of the transfer case 25. In FIG. 5, for convenience of understanding the description herein, only a part of the large number of plate elements 38 forming the shell model 39 are shown as enlarged for exaggeration.

Then, the control device 11 reads out from the disk device 15 each of the specifications data 28 on the finite element model 27 generated in step S12 and the specifications data 40 on the shell model 39 generated in step S15, and outputs the models 27 and 39 to the output device 13 for display. The control device 11 then superimposes the shell model 39 on the surface of the finite element model 27 on the screen of the output device 13 to generate an acoustic characteristics optimization model 42 (see FIG. 6) that allows the thickness of each plate element 38 of the shell model 39 to be virtually changed through calculation for optimizing the acoustic characteristics, and causes the disk device 15 to store specifications data 43 on the generated acoustic characteristics optimization model 42 (step S16). In this respect, the control device 11 may be considered to include an acoustic characteristics optimization model generation section 44 which serves as an acoustic characteristics optimization model generation unit that superimposes the shell model 39 on the surface of the finite element model 27 to generate an acoustic characteristics optimization model 42 of the transfer case 25.

Subsequently, the control device 11 outputs a setup screen for setting various conditions about the acoustic characteristics optimization model 42 generated in step S16 to the input device 12 for display. Then, an operator sets an excitation force to be applied to each plate element 38 of the shell model 39 disposed on the surface of the acoustic characteristics optimization model 42 on the screen of the input device 12. At the same time, when optimizing the acoustic characteristics of the acoustic characteristics optimization model 42, the operator sets on the screen of the input device 12 an observation point (not shown) at which the sound pressure transmitted from the acoustic characteristics optimization model 42 is observed at a predetermined position outside the acoustic characteristics optimization model 42, and then sets the frequency band of the sound pressure to be observed at the set observation point (step S17).

Then, the control device 11 reads out from the disk device 15 the specifications data 43 on the acoustic characteristics optimization model 42 generated in step S16, and calculates the rate of displacement of each plate element 38 of the shell model 39 disposed on the surface of the read acoustic characteristics optimization model 42 that occurs in accordance with the excitation force set in step S17 (step S18).

Subsequently, as an acoustic transfer function calculation step, the control device 11 reads out from the disk device 15 the specifications data 32 on the boundary element model 31 generated in step S13, and calculates an acoustic transfer function that correlates the rate of displacement of each nodal point 36 on the boundary element model 31 with the sound pressure transmitted from the boundary element model 31 to the observation point in accordance with the displacement of that nodal point 36 on the basis of the relative positional relationship between each nodal point 36 set on the read boundary element model 31 and the observation point for the sound pressure set in step S17 (step S19). In this respect, the control device 11 may be considered to include an acoustic transfer function calculation section 45 which serves as an acoustic transfer function calculation unit that calculates an acoustic transfer function that correlates each nodal point 36 on the boundary element model 31 with the sound pressure transmitted from the boundary element model 31 in accordance with displacement of that nodal point 36. The sound pressure transmitted from each nodal point 36 on the boundary element model 31 is represented by the following [Formula 2] using the acoustic transfer function calculated in step S19.

$$SP(\omega) = [ATV(\omega)] \cdot [v(\omega)] \quad \text{[Formula 2]}$$
$$= [atv_{B1}(\omega), \ldots , atv_{BN}(\omega)] \cdot$$
$$[v_{BG_1}(\omega), \ldots , v_{BG_N}(\omega)]$$
$$= atv_{B1}(\omega)v_{BG_1}(\omega) + \ldots + atv_{BN}(\omega)v_{BG_N}(\omega).$$

Then, as a sound pressure calculation step, the control device 11 substitutes [Formula 1], which is a relational formula that correlates each nodal point 36 on the boundary element model 31 with each nodal point 35 on the finite element model 27, into [Formula 2], which is a relational formula that correlates each nodal point 36 on the boundary element model 31 with the sound pressure transmitted from that nodal point 36 to the observation point, so as to derive a calculation formula for the sound pressure transmitted from each nodal point 35 on the finite element model 27 to the observation point indicated by the following [Formula 3].

$$SP(\omega) = atv_{B1}(\omega)v_{BG_1}(\omega) + \ldots + atv_{BN}(\omega)v_{BG_N}(\omega) \quad \text{[Formula 3]}$$
$$= atv_{B1}(\omega)\begin{pmatrix} \alpha_{11}v_{FG_{11}} + \alpha_{12}v_{FG_{12}} + \\ \alpha_{13}v_{FG_{13}} \end{pmatrix} + \ldots +$$
$$atv_{BN}(\omega)\begin{pmatrix} \alpha_{N1}v_{FG_{N1}} + \alpha_{N2}v_{FG_{N2}} + \\ \alpha_{N3}v_{FG_{N3}} \end{pmatrix}.$$

In the embodiment, on the surface of the acoustic characteristics optimization model 42, each nodal point 35 on the finite element model 27 is disposed to be positioned on each plate element 38 of the shell model 39. Thus, the control device 11 incorporates the rate of displacement of each plate element 38 of the shell model 39 calculated in step S18 into the calculation formula for the sound pressure so as to derive a calculation formula for the sound pressure transmitted from the surface of the acoustic characteristics optimization model 42 to the observation point, and temporarily stores the derived calculation formula for the sound pressure in the RAM 20 as SPold (step S20). In this respect, the control device 11 may be considered to include a sound pressure calculation section 46 which serves as a sound pressure calculation unit that calculates the sound pressure transmitted from the acoustic characteristics optimization model 42 to the observation point.

Subsequently, the control device 11 executes a sensitivity analysis in which it is analyzed how much each setting variable defining the behavior of the acoustic characteristics optimization model 42 affects the acoustic characteristics of the acoustic characteristics optimization model 42 when the thickness of each plate element 38 of the shell model 39 disposed on the surface of the acoustic characteristics optimization model 42 is changed, on the basis of the calculation formula for the sound pressure derived in step S20 (step S21).

Then, the control device 11 reads out from the ROM 19 an optimization algorithm for optimizing the acoustic characteristics of the acoustic characteristics optimization model 42, and incorporates the analysis results from the sensitivity analysis executed in step S21 into the read optimization algorithm to calculate an optimum solution, which indicates the amount of thickness to be changed in order to optimize the acoustic characteristics transmitted from the acoustic characteristics optimization model 42 to the observation point, for each plate element 38 of the shell model 39 positioned on the surface of the acoustic characteristics optimization model 42 (step S22).

Then, the control device 11 generates an element thickness change model 47 (see FIG. 6), in which the thickness of each plate element 38 of the shell model 39 positioned on the surface of the acoustic characteristics optimization model 42 has been changed, on the basis of the optimum solution calculated in step S22, and stores specifications data 48 on the generated element thickness change model 47 in the disk device 15 (step S23). In this respect, the control device 11 may be considered to include an acoustic characteristics optimization model change section 49 which serves as an acoustic characteristics optimization model change unit that changes the thickness of each plate element 38 of the shell model 39 to optimize the acoustic characteristics of the acoustic characteristics optimization model 42. In the embodiment, when optimizing the acoustic characteristics of the acoustic characteristics optimization model 42, the control device 11 virtually changes the thickness of each plate element 38 of the shell model 39 positioned on the surface of the acoustic characteristics optimization model 42 through calculation for optimizing the acoustic characteristics of the acoustic characteristics optimization model 42. Therefore, each nodal point 35 on the finite element model 27 is disposed to be positioned on each plate element 38 of the shell model 39 at all times in the course of optimizing the acoustic characteristics of the acoustic characteristics optimization model 42.

Subsequently, the control device 11 reads out from the disk device 15 the specifications data 48 on the element thickness change model 47 generated in step S23, and calculates the rate of displacement of each plate element 38 of the shell model 39 positioned on the surface of the read element thickness change model 47 that occurs in accordance with the excitation force set in step S17 (step S24). Since the element thickness change model 47 is generated by virtually changing the thickness of each plate element 38 of the shell model 39, the rate of displacement of each plate element 38 of the shell model 39 according to the excitation force set in step S17 is different from the rate of displacement of each plate element 38 of the shell model 39 positioned on the surface of the acoustic characteristics optimization model 42 derived in step S18.

Then, the control device 11 incorporates the rate of displacement of each plate element 38 of the shell model 39 on the element thickness change model 47 calculated in step S24 into the calculation formula for the sound pressure transmitted from the surface of the acoustic characteristics optimization model 42 to the observation point derived in step S20 to derive a calculation formula for the sound pressure transmitted from the surface of the element thickness change model 47 to the observation point, and temporarily stores the derived calculation formula for the sound pressure in the RAM 20 as SPnew (step S25). An acoustic transfer function used in the calculation formula for the sound pressure derived in step S25 is determined in accordance with the relative positional relationship between each plate element 38 of the shell model 39 positioned on the surface of the acoustic characteristics optimization model 42 and the observation point. In this respect, in the embodiment, the control device 11 virtually changes the thickness of each plate element 38 of the shell model 39 through calculation without changing the relative positional relationship between each plate element 38 of the shell model 39 positioned on the surface of the acoustic characteristics optimization model 42 and the observation point in the course of optimizing the acoustic characteristics of the acoustic characteristics optimization model 42. Therefore, the control device 11 can recursively use the acoustic transfer function calculated in step S20 in the course of deriving a calculation formula for the sound pressure transmitted from the element thickness change model 47 to the observation point in step S25.

Subsequently, as a determination step, the control device 11 determines whether or not the acoustic characteristics of the element thickness change model 47, in which the thickness of each plate element 38 of the shell model 39 has been changed, have been optimized (step S26). Specifically, the control device 11 first reads out from the RAM 20 the calculation formula SPold for the sound pressure transmitted from the surface of the acoustic characteristics optimization model 42 to the observation point derived in step S20 and the calculation formula SPnew for the sound pressure transmitted from the surface of the element thickness change model 47 to the observation point derived in step S25, and outputs to the output device 13 respective graphs corresponding to the calculation formulas SPold and SPnew (see FIG. 7). The control device 11 then integrates a region between the respective graphs output to the output device 13 in the frequency direction (in the direction of the horizontal axis in the graphs shown in FIG. 7) within the frequency band for the sound pressure set in step S17 to calculate an absolute value of the difference between the sound pressures indicated by the respective graphs (that is, |SPold−SPnew|). The control device 11 then determines whether or not the calculated absolute value of the difference between the sound pressures is below a value preset as a determination criterion for determining whether or not the acoustic characteristics of the element thickness change model 47 have been optimized.

In the case where the determination result in step S26 is negative, the control device 11 determines that the sound pressure transmitted from the surface of the element thickness change model 47 to the observation point has not been sufficiently reduced, and overwrites the calculation formula SPold in the RAM 20 with the current calculation formula SPnew for the sound pressure transmitted from the surface of the element thickness change model 47 to the observation point (step S27). Thereafter, the process returns to step S21 to repeat the processes in steps S21 to S26 in order to further optimize the acoustic characteristics of the element thickness change model 47.

On the other hand, in the case where the determination result in step S26 is positive, the control device 11 determines that the sound pressure transmitted from the surface of the element thickness change model 47 to the observation point has been sufficiently reduced as a result of the change in thickness of each plate element 38 of the shell model 39 positioned on the surface of the acoustic characteristics optimization model 42, determines that optimization of the acoustic characteristics of the element thickness change model 47 has been completed, and stores the current specifications data 48 of the element thickness change model 47 in the disk device 15 (step S27). The acoustic characteristics optimization process routine is thus terminated.

When analyzing the acoustic characteristics during vibration of the transfer case 25 in detail, it is necessary to convert the CAD data 26 on the transfer case 25 into the specifications data 28 on the finite element model 27. However, in the case where the setting variables used in the function for correlating the rate of displacement of each nodal point 35 set on the finite element model 27 with the sound pressure transmitted from the finite element model 27 to the observation point in accordance with the displacement of that nodal point 35 are recalculated each time the structural configuration of the transfer case 25 is changed in the course of optimizing the acoustic characteristics of the transfer case 25, an excessive processing load may be imposed on the control device 11 when optimizing the acoustic characteristics of the transfer case 25, and thus it may be difficult to derive an optimum structural configuration of the transfer case 25 reliably in a short time.

In this respect, according to the computer system 10 of the embodiment, the control device 11 superimposes the shell model 39, which is obtained by dividing the surface of the finite element model 27 into a large number of plate elements 38, on the surface of the finite element model 27 to generate an acoustic characteristics optimization model 42. The control device 11 then virtually changes the thickness of each plate element 38 of the shell model 39 through calculation without changing the relative positional relationship between each plate element 38 of the shell model 39 positioned on the surface of the acoustic characteristics optimization model 42 and the observation point in the course of optimizing the acoustic characteristics of the acoustic characteristics optimization model 42.

Therefore, after preparing an element thickness change model 47 in which the thickness of each plate element 38 of the shell model 39 has been changed, the control device 11 can recursively use an acoustic transfer function, which is calculated on the basis of the relative positional relationship between each plate element 38 of the shell model 39 positioned on the surface of the acoustic characteristics optimization model 42 and the observation point, in the course of deriving a calculation formula for the sound pressure transmitted from the element thickness change model 47 to the observation point.

That is, according to the computer system 10 of the embodiment, the control device 11 can analyze the acoustic characteristics during vibration of the transfer case 25 on the basis of the rate of displacement of each plate element 38 of the shell model 39, and can recursively execute optimization of the acoustic characteristics of the transfer case 25 on the basis of the analysis results to obtain the detailed distribution of the thickness of each region of the transfer case 25 with optimized acoustic characteristics (see FIG. 8), without imposing an excessive processing load on a computer.

Thus, the embodiment can provide the following effects.

(1) In the embodiment, even when the control device 11 virtually changes the thickness of each plate element 38 of the shell model 39 in the course of optimizing the acoustic characteristics of the acoustic characteristics optimization model 42, each nodal point 35 on the finite element model 27 is still disposed to be positioned on each plate element 38 of the shell model 39 on the surface of the acoustic characteristics optimization model 42. Therefore, even when the thickness of each plate element 38 of the shell model 39 is changed in the course of optimizing the acoustic characteristics of the acoustic characteristics optimization model 42, the sound pressure transmitted from the acoustic characteristics optimization model 42 to the observation point can be calculated by introducing each nodal point 35 on the finite element model 27, which is correlated with each nodal point 36 set on the boundary element model 31, into an acoustic transfer function that indicates the correspondence between displacement of each nodal point 36 on the boundary element model 31 and the sound pressure transmitted from the boundary element model 31 to the observation point in accordance with the displacement of that nodal point 36. In addition, the acoustic transfer function is determined in accordance with the relative positional relationship between each nodal point 36 on the boundary element model 31 and the observation point, and therefore the acoustic transfer function can be used recursively in calculating the sound pressure transmitted from the acoustic characteristics optimization model 42 to the observation point in the course of optimizing the acoustic characteristics of the acoustic characteristics optimization model 42. Thus, the control device 11 can analyze the structural configuration of the transfer case 25 with optimized acoustic characteristics reliably in a short time without imposing an excessive processing load.

(2) In the embodiment, the control device 11 can determine that the sound pressure transmitted from the element thickness change model 47 to the observation point has been sufficiently reduced as a result of optimization of the acoustic characteristics of the element thickness change model 47, and then determine that optimization of the acoustic characteristics of the element thickness change model 47 has been completed, when the difference between the sound pressure transmitted from the acoustic characteristics optimization model 42 to the observation point before a change in thickness of each plate element 38 of the shell model 39 and the sound pressure transmitted from the element thickness change model 47 to the observation point after a change in thickness of each plate element 38 of the shell model 39 falls below a preset threshold.

The above embodiment may be modified as follows.

In the embodiment, the control device 11 may integrate a region between the graph indicating the calculation formula SPold for the sound pressure transmitted from the surface of the acoustic characteristics optimization model 42 to the observation point and the graph indicating the calculation formula SPnew for the sound pressure transmitted from the surface of the element thickness change model 47 to the observation point in the frequency direction within a specific portion of the frequency band to be analyzed in which an optimization process is executed intensively to calculate an absolute value of the difference between the sound pressures indicated by the respective graphs, and may determine whether or not the acoustic characteristics of the element thickness change model 47 have been optimized on the basis of the calculated absolute difference value.

In the embodiment, the subject to be analyzed is not limited to the transfer case 25, and may be any design model having a three-dimensional shape.

What is claimed is:

1. An acoustic characteristics optimization model analysis apparatus comprising a computer system including a control device, the control device comprising:
a finite element model generation unit that generates on the basis of a structural configuration of a design model having a three-dimensional shape a finite element model for analyzing acoustic characteristics of the design model by a finite element method;
a boundary element model generation unit that generates a boundary element model for analyzing the acoustic characteristics of the design model by a boundary element method on the basis of the finite element model;
an acoustic transfer function calculation unit that calculates an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points;
a nodal point association unit that correlates the plurality of nodal points set for the boundary element model with a plurality of nodal points set between a plurality of element regions forming the finite element model;
a sound pressure calculation unit that incorporates the plurality of nodal points of the finite element model correlated with the plurality of nodal points of the boundary element model by the nodal point association unit into the acoustic transfer function calculated by the acoustic transfer function calculation unit to calculate a sound pressure transmitted from the finite element model to the predetermined position;
a shell model generation unit that generates a shell model by dividing a surface of the finite element model into a plurality of plate elements;
an acoustic characteristics optimization model generation unit that superimposes the shell model on the surface of the finite element model to generate an acoustic characteristics optimization model;
an acoustic characteristics optimization model change unit that virtually changes a thickness of each of the plate elements of the shell model through calculation for optimizing acoustic characteristics of the acoustic characteristics optimization model on the basis of a result of calculation performed by the sound pressure calculation unit without changing relative positional relationship between the plurality of plate elements of the shell model positioned on a surface of the acoustic characteristics optimization model and the predetermined position; and
a determination unit that determines whether or not the acoustic characteristics of the acoustic characteristics optimization model in which the thickness of each of the plate elements of the shell model has been changed by the acoustic characteristics optimization model change unit have been optimized,
wherein the acoustic characteristics optimization model change unit, on the basis of a result of calculation performed by the sound pressure calculation unit, further changes the thickness of each of the plate elements of the shell model to optimize the acoustic characteristics of the acoustic characteristics optimization model in the case where a result of determination performed by the determination unit is negative.

2. The acoustic characteristics optimization model analysis apparatus according to claim 1,
wherein the determination unit determines that the acoustic characteristics of the acoustic characteristics optimization model have been optimized when a difference between a sound pressure transmitted from the acoustic characteristics optimization model before the model change unit changes the thickness of each of the plate elements of the shell model to the predetermined position and a sound pressure transmitted from the acoustic characteristics optimization model after the model change unit changes the thickness of each of the plate elements of the shell model to the predetermined position falls below a preset threshold.

3. An acoustic characteristics optimization model analysis method comprising:
generating on the basis of a structural configuration of a design model having a three-dimensional shape a finite element model for analyzing acoustic characteristics of the design model by a finite element method;

generating a boundary element model for analyzing the acoustic characteristics of the design model by a boundary element method on the basis of the finite element model;

calculating an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points;

correlating the plurality of nodal points set for the boundary element model with a plurality of nodal points set between a plurality of element regions forming the finite element model;

incorporating the plurality of nodal points of the finite element model correlated with the plurality of nodal points of the boundary element model in the correlating of the plurality of nodal points into the acoustic transfer function calculated in the calculating of the acoustic transfer function to calculate a sound pressure transmitted from the finite element model to the predetermined position;

generating a shell model by dividing a surface of the finite element model into a plurality of plate elements;

superimposing the shell model on the surface of the finite element model to generate an acoustic characteristics optimization model;

virtually changing a thickness of each of the plate elements of the shell model through calculation for optimizing acoustic characteristics of the acoustic characteristics optimization model on the basis of a result of the sound pressure calculation without Changing relative positional relationship between the plurality of plate elements of the shell model positioned on a surface of the acoustic characteristics optimization model and the predetermined. position; and determining whether or not the acoustic characteristics of the acoustic characteristics optimization model in which the thickness of each of the plate elements of the shell model has been changed have been optimized, and further changing, on the basis of a result of the sound pressure calculation, the thickness of each of the plate elements of the shell model to optimize the acoustic characteristics of the acoustic characteristics optimization model in the case where a result of determination performed by the determination unit is negative.

4. A non-transitory computer-readable medium containing an acoustic characteristics optimization model analysis program that causes an acoustic characteristics optimization model analysis apparatus to operate, the apparatus including a control unit that controls procedures of a process for optimizing acoustic characteristics of a design model having a three-dimensional shape, the program causing the control unit to function as:

a finite element model generation unit that generates a finite element model for analyzing acoustic characteristics of the design model by a finite element method on the basis of a structural configuration of the design model;

a boundary element model generation unit that generates a boundary element model for analyzing the acoustic characteristics of the design model by a boundary element method on the basis of the finite element model;

an acoustic transfer function calculation unit that calculates an acoustic transfer function for correlating displacement of a plurality of nodal points set between a plurality of element regions forming the boundary element model with a sound pressure transmitted from the boundary element model to a predetermined position outside the boundary element model in accordance with the displacement of the plurality of nodal points;

a nodal point association unit that correlates the plurality of nodal points set for the boundary element model with a plurality of nodal points set between a plurality of element regions forming the finite element model;

a sound pressure calculation unit that incorporates the plurality of nodal points of the finite element model correlated with the plurality of nodal points of the boundary element model by the nodal point association unit into the acoustic transfer function set by the acoustic transfer function calculation unit to calculate a sound pressure transmitted from the finite element model to the predetermined position;

a shell model generation unit that generates a shell model by dividing a surface of the finite element model into a plurality of plate elements;

an acoustic characteristics optimization model generation unit that superimposes the shell model on the surface of the finite element model to generate an acoustic characteristics optimization model;

an acoustic characteristics optimization model change unit that virtually changes a thickness of each of the plate elements of the shell model through calculation for optimizing acoustic characteristics of the acoustic characteristics optimization model on the basis of a result of calculation performed by the sound pressure calculation unit without changing relative positional relationship between the plurality of plate elements of the shell model positioned on a surface of the acoustic characteristics optimization model and the predetermined position; and a determination unit that determines whether or not the acoustic characteristics of the acoustic characteristics optimization model in which the thickness of each of the plate elements of the shell model has been changed by the acoustic characteristics optimization model change unit have been optimized, wherein the acoustic characteristics optimization model change unit, on the basis of a result of calculation performed by the sound pressure calculation unit, further changes the thickness of each of the plate elements of the shell model to optimize the acoustic characteristics of the acoustic characteristics optimization model in the case where a result of determination performed by the determination unit is negative.

* * * * *